United States Patent
Westra et al.

(10) Patent No.: US 8,191,820 B1
(45) Date of Patent: Jun. 5, 2012

(54) FLYING WING AIRCRAFT

(75) Inventors: Bryan Wayne Westra, LaPalma, CA (US); Roxanne Marie Sato, Rancho Palos Verdes, CA (US); Douglas Ellwood Shultz, La Habra, CA (US); James Franklin Kerswell, Los Angeles, CA (US); Perry Bruce Petersen, Pinehurst, NC (US); Scott Walter Collins, Upland, CA (US)

(73) Assignee: Northrop Gurmman Corporation, Falls Church, VA (US)

( * ) Notice: Subject to any disclaimer, the term of this patent is extended or adjusted under 35 U.S.C. 154(b) by 774 days.

(21) Appl. No.: 12/001,218

(22) Filed: Dec. 11, 2007

(51) Int. Cl.
*B64C 39/10* (2006.01)
*B64C 5/04* (2006.01)
*B64C 5/12* (2006.01)
*B64C 21/04* (2006.01)

(52) U.S. Cl. ............ 244/36; 244/207; 244/45 A; 244/49

(58) Field of Classification Search .................... 244/13, 244/36, 45 A, 207, 208, 46, 49
See application file for complete search history.

(56) References Cited

U.S. PATENT DOCUMENTS

| | | | | |
|---|---|---|---|---|
| 2,924,400 A * | 2/1960 | Ruget | ............................. | 244/46 |
| 3,056,566 A | 10/1962 | Davidson | ........................ | 244/15 |
| 3,108,768 A * | 10/1963 | Thomas | ...................... | 244/45 A |
| 3,188,022 A * | 6/1965 | Ornberg | ........................ | 244/45 A |
| 3,642,234 A * | 2/1972 | Kamber et al. | ............. | 244/45 A |
| 3,883,094 A * | 5/1975 | Mederer | ...................... | 244/45 A |
| 4,033,526 A * | 7/1977 | Benson | ............................ | 244/15 |
| 4,641,800 A * | 2/1987 | Rutan | ............................ | 244/218 |
| 4,848,701 A * | 7/1989 | Belloso | ......................... | 244/12.5 |
| 5,082,204 A * | 1/1992 | Croston | ......................... | 244/126 |
| 5,542,625 A * | 8/1996 | Burhans et al. | ............. | 244/45 R |
| RE35,387 E * | 12/1996 | Strom | ......................... | 244/75.1 |
| 5,842,666 A * | 12/1998 | Gerhardt et al. | ................ | 244/15 |
| 5,909,858 A * | 6/1999 | Hawley | ............................ | 244/36 |
| 5,992,792 A | 11/1999 | Arnason et al. | ................ | 244/13 |
| 6,568,632 B2 * | 5/2003 | Page et al. | ........................ | 244/36 |
| 6,595,466 B2 * | 7/2003 | Depeige et al. | ............ | 244/118.3 |
| 6,708,924 B2 * | 3/2004 | Page et al. | ........................ | 244/36 |

* cited by examiner

*Primary Examiner* — Joseph W Sanderson
(74) *Attorney, Agent, or Firm* — Stetina Brunda Garred & Brucker

(57) ABSTRACT

The invention is an aircraft that includes a flying wing having a plurality of extendable flaps mounted on the trailing edge of the flying wing. A canard is mounted on the nose of said flying wing. A system is mounted in the flying wing for providing high pressure air over the canard and the flaps. A second system is provided for controlling the flow of air over the canard to provide pitch control of the aircraft.

13 Claims, 4 Drawing Sheets

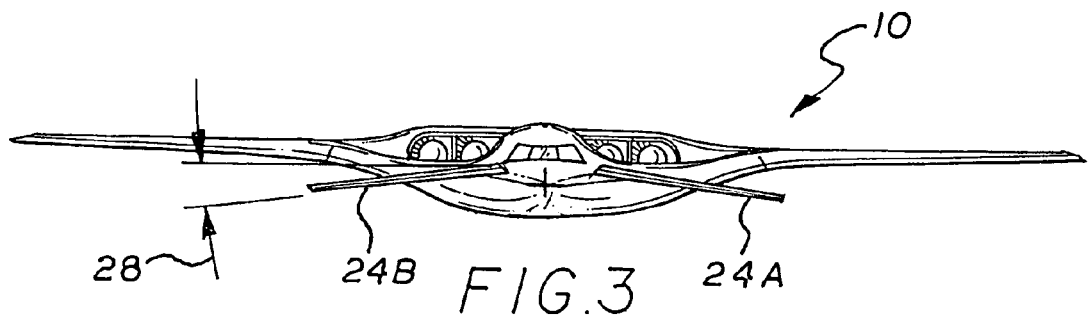
FIG.3
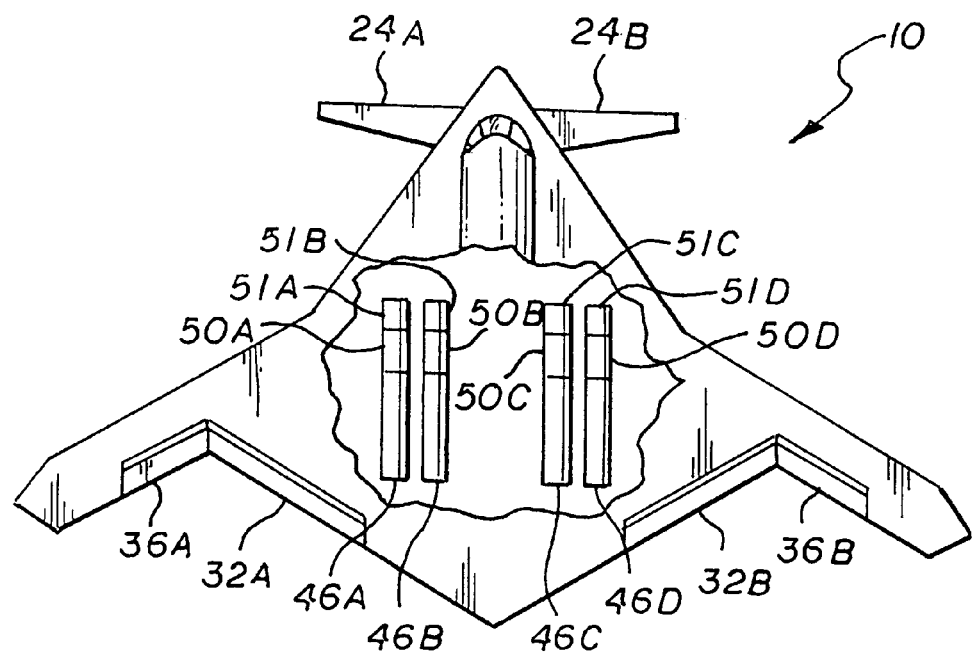
FIG.4
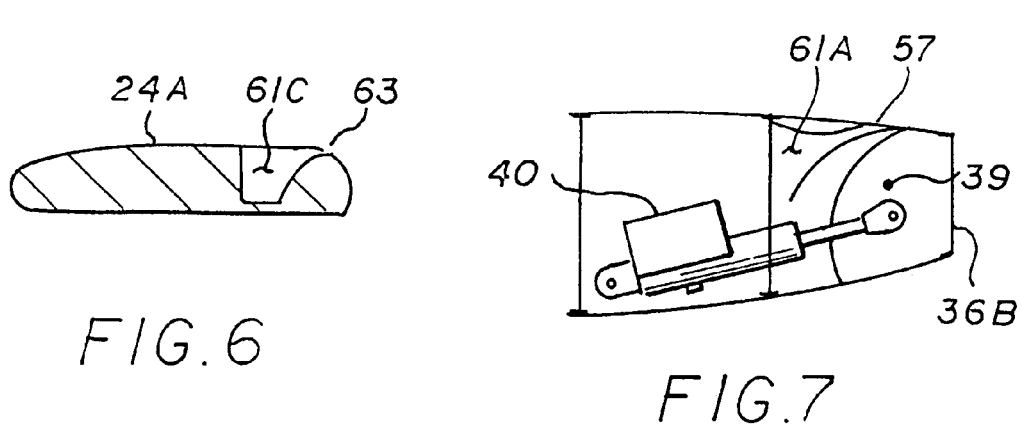
FIG.6
FIG.7

FLYING WING AIRCRAFT

BACKGROUND OF THE INVENTION

1. Field of the Invention

The invention relates to the field of flying wing aircraft and, in particular, to a flying wing aircraft with lift augmentation systems.

2. Description of Related Art

Flying wing type aircraft are old in the art. They are generally characterized as having an integrated central portion (fuselage in conventional aircraft) and wings wherein both produce lift. The aerodynamic efficiency of flying wing aircraft is well established.

Canards are also old in the art, and some designs, such as the Russian TU-144 supersonic transport, have retractable and are only used for takeoff and landing. Also blown flaps, are old in the art. Such systems are known to greatly improve the lift of the wings. In U.S. Pat. Nos. 3,056,566 Jet Propelled Aircraft by I. M. Davidson and 5,992,792 Aircraft With Jet Flap Propulsion by K Arnason, et al. disclose aircraft with blown canards incorporating a rear mounted blown flap. Such systems are called by various names (e.g. jet flaps, blown flaps, etc.) however they simply exercise circulation control of the surrounding air to achieve lift augmentation.

However, none of the prior art disclose a flying wing type aircraft with a blown retractable canard, without flaps, and blown main wing flaps, wherein the pitch of the aircraft at low speed is controlled by varying the flow of air over the canard.

Thus, it is a primary object of the invention to provide a flying wing type aircraft with a retractable canard.

It is another primary object of the invention to provide a flying wing type aircraft with a retractable, circulation control canard.

It is a further object of the invention to provide a flying wing type aircraft with a retractable, circulation control wherein the airflow over the canard can be varied to provide pitch control.

SUMMARY OF THE INVENTION

The invention is an aircraft that includes a flying wing having a longitudinal axis, vertical axis, and a horizontal axis. The leading edge of the wing from the nose has a sweep angle of 30 to 80 degrees from the horizontal axis and may have an outboard segment with the leading edge sweep angle similarly defined of between 0 and 80 degrees as measured from a local horizontal.

A canard is mounted near the nose. The aircraft's canard, being generally only needed when taking off and landing is retractable. The aircraft also includes a plurality of extendable flaps mounted on the trailing edge of the flying wing. Various means for providing circulation control of the wing and the canard may be employed. In this description an air distribution system is mounted in the flying wing for providing high pressure air over the canard and the flaps as a means to increase control power and aircraft lift. The air distribution, preferably, includes a propulsion system for powering the aircraft comprises at least one turbofan engine, the propulsion system adapted to provide fan air for takeoff or fan air in combination with compressor bleed air upon landing. A ducting system is coupled to the at least one turbofan engine and is connected to a first air distribution system for directing air flow over the flaps and a second air distribution system for directing air over the canard. An air flow system is provided for controlling airflow over the canard to provide pitch control to the aircraft.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 3 is a front view of the aircraft shown in FIG. 1.

FIG. 4 is a view of the aircraft shown in FIG. 1 partially broken away to show the engines.

FIG. 6 is a cross-sectional view the canard taken along the line 5-5 in FIG. 1 illustrating the airflow about the canard when the canard is blown.

FIG. 7 is a cross-sectional view of one of the flaps at the trailing edge of the wing.

DESCRIPTION OF THE PREFERRED EMBODIMENT

Figure 1:
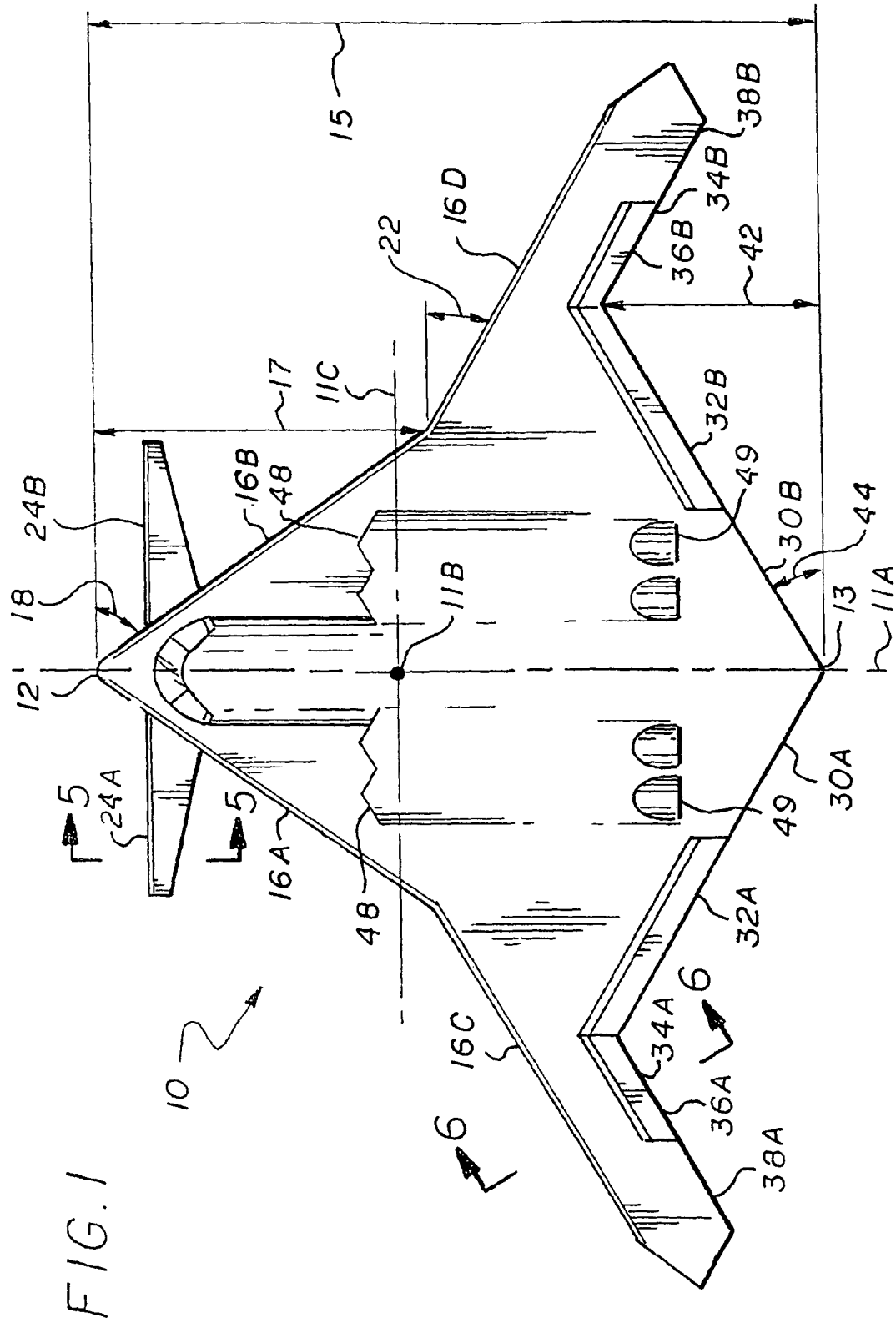
FIG. 1 is a planform view of a flying wing type aircraft partially broken away to show the interior thereof.
Figure 2:
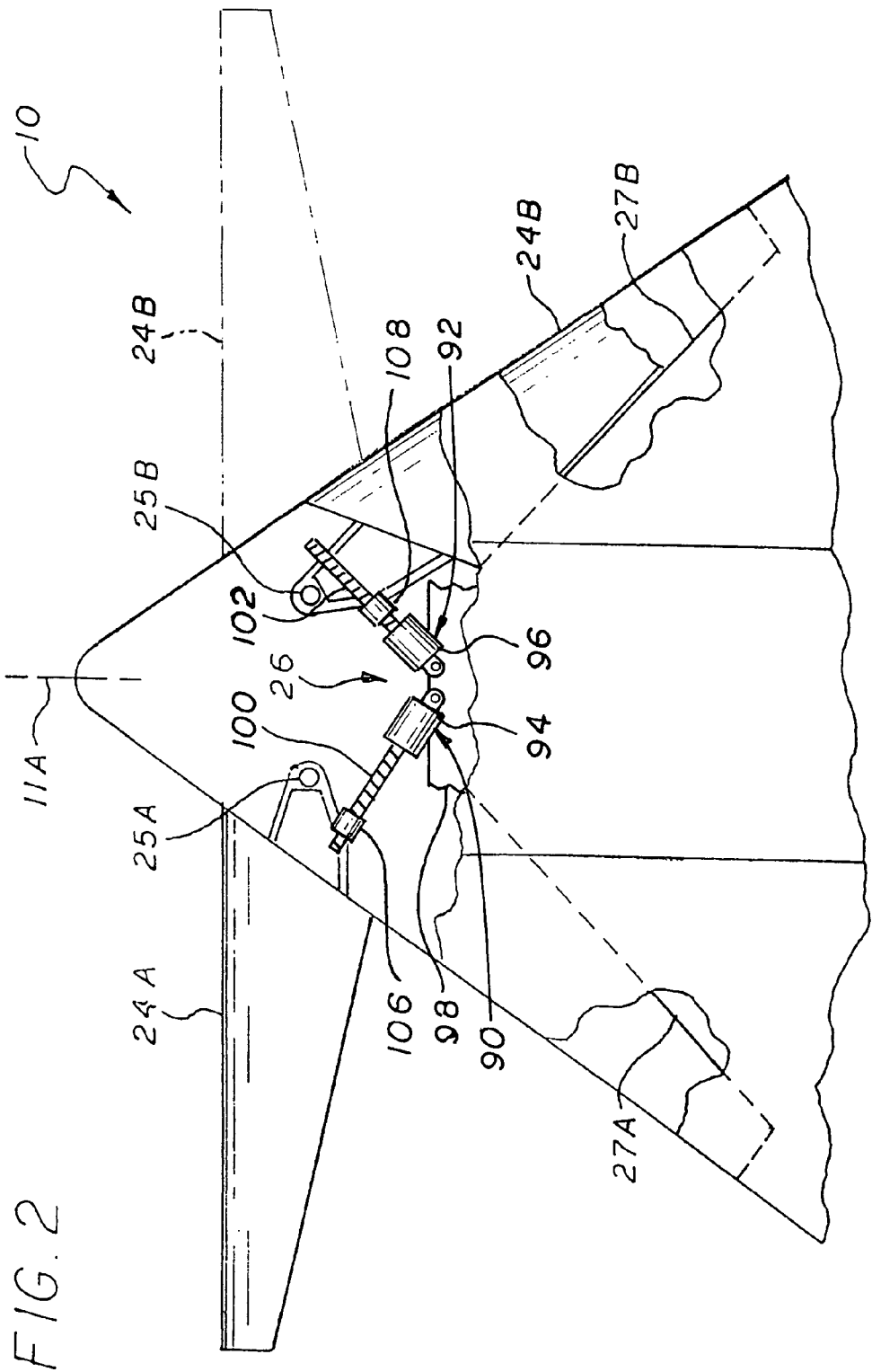
FIG. 2 is a partial cross-sectional view of FIG. 1 illustrating the canard actuation system.

Referring to FIGS. 1-5, the flying wing aircraft, is generally designated by numeral 10 and has longitudinal axis 11A, vertical axis 11B and a horizontal axis 11C. The aircraft 10 includes a nose end 12, tail end 13 with an overall length 15. The right and left inner leading edges 16A and 16B extend back from the nose end 12 over a distance 17 at a sweep angle 18, of between 30 and 80 degrees. The distance 17 is about 40 to 60 percent of the total length 15 of the aircraft. The left and right outer leading edges 16C and 16D A have a sweep angle 22, of between 0 and 80 degrees as measured from a local horizontal.

Figure 5:
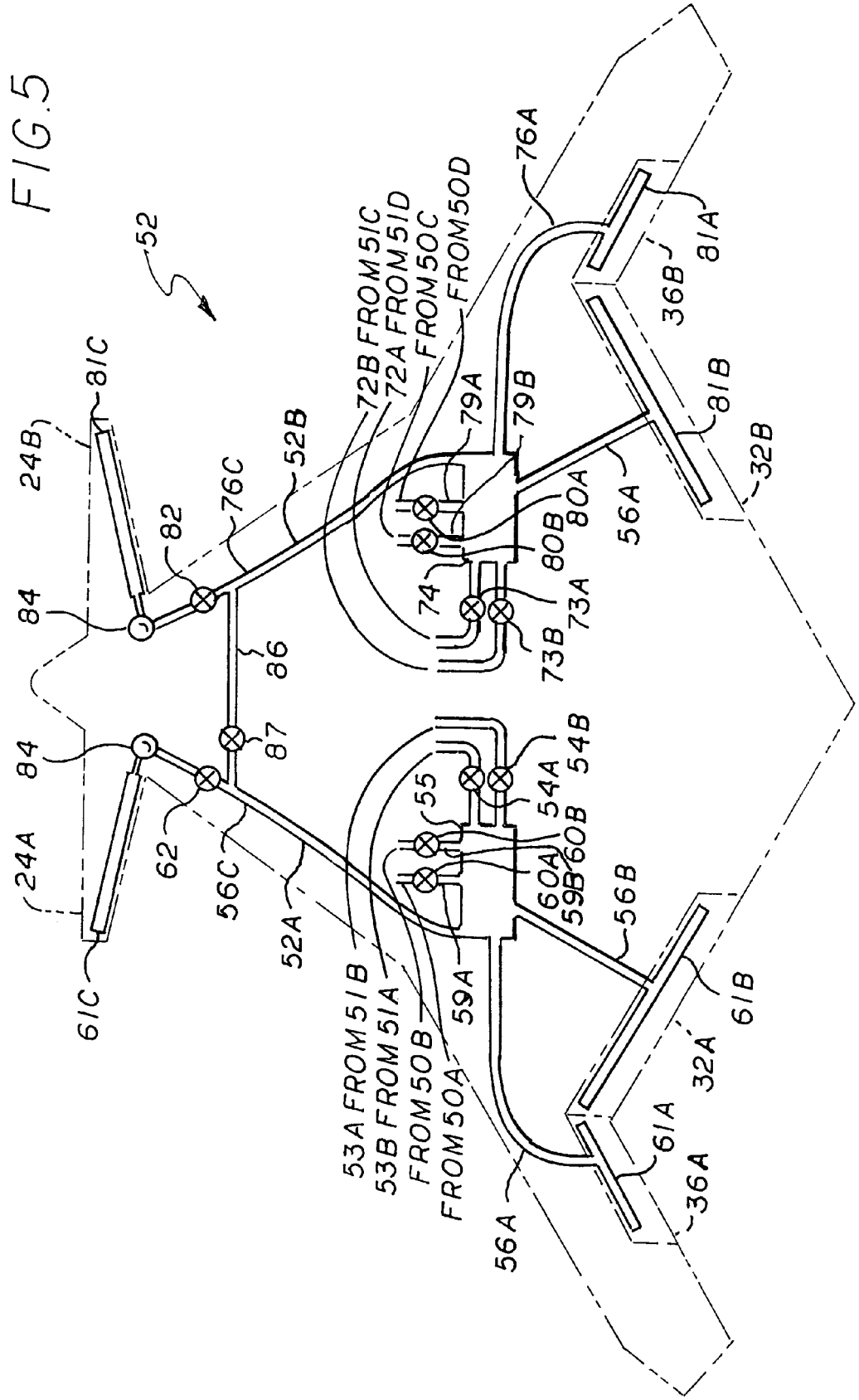
FIG. 5 is a schematic view of the system for blowing air over the flaps and canard of the aircraft shown in FIG. 1.

Mounted in proximity to the left and right inner leading edges 16A and 16B are right and left canards 24A and 24B having Coanda effect airfoil cross-sections (see FIG. 5). The canards 24A and 24B have an axis of rotation 25A and 25B, respectively and an actuation system 26 that retract the canards to form part of the leading edge 16A and 16B or the canards may be retracted onto the wing surface. The actuation system 26 will be subsequently discussed. The canards 24A and 24B have a downward angle 28A or upward angle 28B of between 0 and 20 degrees (see FIG. 3).

The left and right inner trailing edges 30A and 30B include inboard trailing edge flaps 32A and 32B, while the outer left and right outer trailing edges 34A and 348 include outboard trailing edge flaps 36A and 36B. External of the outboard flaps 36A and 36B are split rudders 38A and 38B. Referring particularly to FIG. 5, the outer left flap 36A has a pivot axis 39 and actuator(s) 40. All the flaps are similar.

Again referring to FIGS. 1-7, the left and right inner trailing edges 30A and 30B extends forward from the tail end 13 over a distance 42, which is between 15 and 40 percent of the length 15, at a forward sweep angle 44 of between 0 and 45. The left and right outer trailing edge portions 34A and 34B are generally parallel to the left and right outer leading edges 30A and 30B, respectively.

Mounted within the flying wing are four turbofan engines 46A, 46B 46C and 46D. However, while four engines are shown, the aircraft could only have other propulsion systems and corresponding quantities. The four engines 46A-46D have inlet ducts 48 and exhaust ducts 49 all on the top surface of the aircraft. The engines 46A-46B have compressor sections 50A, 50B, 50C and 50D and fan sections 51A, 51B, 51C and 51D.

A pressurized air distribution system, indicated by numeral 52, is installed in the aircraft 10. The distribution system 52 is divided into two halves 52A and 52B. Distribution system 52A includes lines 53A and 53B coupled to the fan sections 50A and 50B of the engines 46A and 46B which included pressure regulator shut off valves 54A and 54B mounted therein. The lines 53A and 53B connect to a distribution duct 55, which provides high pressure air to ducts 56A and 56B and 56C.

At takeoff, the engines are at full power and there is sufficient air at high enough pressure level that only fan air is necessary. However, upon landing, where the engines are at a reduced power setting, additional air from the compressor sections of the engine is provided to maintain pressure levels. Thus coupled to the distribution duct 55 are lines 59A and 59B, having control pressure regulator valves 60A and 60B mounted therein, which are connected to the compressor section 51A and 51A of the engines 46A and 46B. Therefore, upon landing, the valves 60A and 60B are opened.

Duct 56A connects to distribution channel 61A, which distributes air over the left outboard flap 36A and part of inboard flap 32A via slot 57 (see FIG. 6). Duct 56B connects to distribution channel 61B, which distributes air over the left inboard flap 32A. Duct 56C distributes air to distribution channel 61C via a flow control valve 62 and pivoting connection 64 to left canard 24A (see FIG. 5) The valve 62 is used to control the airflow over left canard 24A, which exits slot 63 in the distribution channel 61C to very the lift produced thereby (see FIG. 6).

The distribution system 50B includes lines 72A and 72B coupled to the fan sections 51C and 51D of the engines 46C and 46D which include pressure regulator shut off valves 73A and 73B mounted therein. The lines 72A and 72B connect to a distribution duct 74, which provides high pressure air to ducts 76A and 76B and 76C.

As previously stated, at takeoff, the engines are at full power and there is sufficient air at high enough pressure level that only fan air is necessary. However, upon landing, where the engines are at a much reduced power setting, it is necessary to provide additional air from the compressor sections of the engine to maintain pressure levels. Thus coupled to the distribution duct 74 are lines 79A and 79B, having control pressure regulator valves 80A and 80B mounted therein, which are connected to the compressor section 50C and 50D of the engines 46C and 46D. Therefore, upon landing, the valves 80A and 80B are opened.

Duct 76A connects to distribution channel 81A, which distributes air over the trailing edge outboard flap 36B and part of flap 32B. Duct 76B connects to distribution channel 81B, which distributes air over the left inboard flap 32B. Duct 76C distributes air to distribution channel 81C via a flow control valve 82 and pivoting connection 84 to right canard 24B. The valve 82 is used to control the airflow over right canard 24B to very the lift produced thereby.

Thus at takeoff, the right and left canards 24A and 24B are extended. With all engines 46A-46D at full power, compressor bleed air is not required and valves 60A, 60B and 80A, 80B are closed since the engines are at full power. Valves 54A, 54B and 73A and 73B are open. Valves 62 and 82 are open and modulating airflow to the canards 24A and 24B. After takeoff, the left and right canards 24A and 24B are no longer required and are retracted and valves 54A, 54B and 73A, 73B are closed. Upon approach to and landing, the left and right canards 24A and 24B are again extended. Because the power produced by the engines 46A-46D is greatly reduced, the valves, 53A, 53B and 73A and 73B are again opened as well as valves 60A, 60B and 80A, 80B, because both fan and compressor air flow is needed. A crossover duct 86 having flow control valve 87 therein connects duct 56C to duct 76C and is opened should an engine failure occur.

It should be noted that airflow for the flaps and canard can be provided by an auxiliary power unit coupled to an air pump or an electric motor driving an air pump could also be used. However, air extracted from the propulsion system is presently preferred.

Referring back to FIG. 2, the canard actuation system 26 includes two ball screw actuators 90 and 92 each having motors 94 and 96 pivotally attached to aircraft structure 98. Each actuator 90 and 92 have screw shafts 100 and 102, which engage nut members 106 and 108 rotatably mounted on the canards 24A and 24B. Thus rotation of the screw shafts 100 and 102 will cause the canards to extend or retract. For purposes of illustration the canard 24A is shown extended and the canard 24B are always extended and retracted in unison. It should also be noted that other actuation systems may be used.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the aircraft manufacturing industries.

The invention claimed is:

1. An aircraft comprising:
    a flying wing having a longitudinal, horizontal and vertical axis, said flying wing further having a first leading edge portion having a first sweep angle and a second leading edge portion having a second sweep angle equivalent to or less than said first sweep angle; and
    a canard mounted on said first leading edge portion;
    wherein said canard includes a fixed leading edge and a fixed trailing edge;
    wherein said canard is retractable within the vehicle;
    a pressurized air distribution system for providing pressurized air over said canard; and
    said pressurized air distribution system including a control valve for controlling the flow of air over the canard to provide pitch control of the aircraft.

2. The aircraft as set forth in claim 1 comprising:
    said first sweep angle is between 30 and 80 degrees; and
    said second sweep angle is between 0 and 80 degrees.

3. The aircraft as set forth in claim 2 wherein the aircraft has an overall length, the aircraft comprising said first portion extending back from the nose end between 40 and 60 percent of the overall length of the aircraft.

4. The aircraft as set forth in claim 3 wherein the aircraft includes a tail end comprising:
    the trailing edge of said flying wing extending over a third portion of the length of aircraft at a sweep angle of 0 to 45 degrees; and a fourth portion extending rearward at a sweep angle between 0 degrees and that parallel to the second sweep angle.

5. The aircraft as set forth in claim 4 comprising:
a plurality of extendable flaps mounted on said trailing edge.

6. The aircraft as set forth in claim 1 wherein said pressurized air distribution system includes:
a first air distribution system mounted on said canard for distributing pressurized air there over;
a second air distribution system mounted on said flying wing for distributing pressurized air over said flaps;
a propulsion system having at least one jet engine, said propulsion system adapted to provide pressurized air; and
means for conducting pressurized air coupled with said at least one jet engine;
said means for conducting pressurized air being also coupled said first and second air distribution systems.

7. The aircraft as set forth in claim 6 wherein the control valve is mounted in said means for controlling airflow to said first air distribution system, such that airflow over said canard can be varied to adjust the lift produced by said canard to provide pitch control.

8. The aircraft as recited in claim 1 including first and second retractable canards mounted on the aircraft leading edge portion on opposing sides of the aircraft longitudinal axis; wherein the pressurized air distribution system provides pressurized air over each of said first and second canards; and first and second control valves for controlling the flow of air over the canards, the first and second controlled valves being operative to control the flow air over the first and second canards, respectively.

9. An aircraft comprising:
a flying wing having a longitudinal, horizontal and vertical axis, said flying wing further having a first leading edge portion having a first sweep angle and a second leading edge portion having a second sweep angle less than or equal to said first sweep angle;
a plurality of trailing edge flaps mounted on said flying wing;
a retractable canard mounted near the nose of said flying wing;
a pressurized air distribution system mounted in said flying wing for providing pressurized air over said second canard and said flaps; and
said pressurized air distribution system including a control valve for controlling the flow of air over said canard to provide pitch control of the aircraft;
wherein the canard includes a fixed leading edge and a fixed trailing edge.

10. The aircraft as set forth in claim 9 wherein the canard is at an angle to the horizontal axis of between plus or minus 20 degrees.

11. The aircraft as set forth in claim 10 wherein said pressurized air distribution system includes:
a first air distribution system mounted on said canard for distributing air there over;
a second air distribution system mounted on said flying wing for distributing air over said flaps;
a propulsive system having at least one propulsion system, said propulsion system adapted to provide pressurized air; and
means for conducting pressurized air coupled to said at least one propulsion system;
said means for conducting pressurized air being also coupled to said first and second air distribution systems.

12. The aircraft as set forth in claim 11 wherein the control valve is mounted in said means for controlling airflow to said first distribution system, such that airflow over said canard can be varied to adjust the lift produced by said canard to provide pitch control.

13. The aircraft as recited in claim 9 including first and second retractable canards mounted on the aircraft leading edge portion on opposing sides of the aircraft longitudinal axis; wherein the pressurized air distribution system provides pressurized air over each of said first and second canards; and first and second control valves for controlling the flow of air over the canards, the first and second controlled valves being operative to control the flow air over the first and second canards, respectively.

* * * * *